Sept. 27, 1955  F. A. CLARY, JR  2,719,205
ELECTRICAL CONTROL DEVICE
Filed Dec. 5, 1952
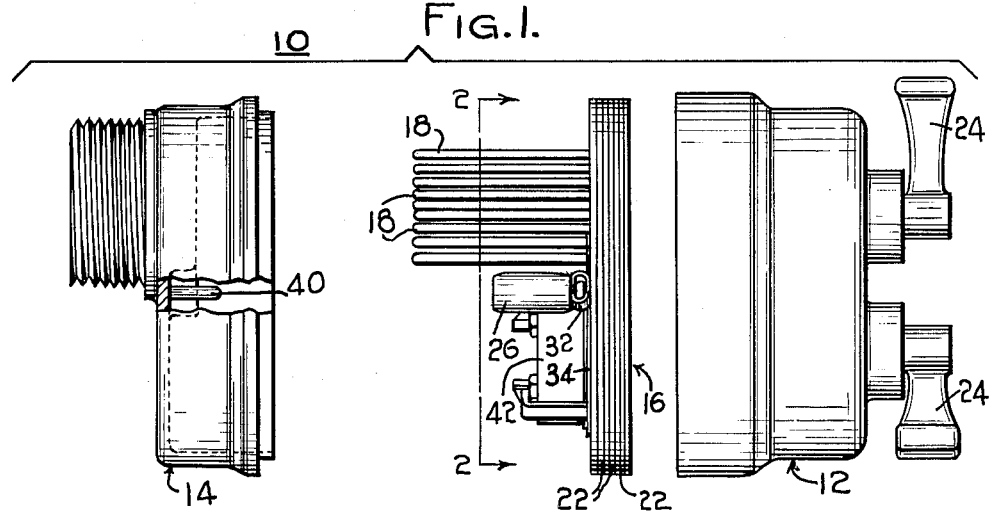
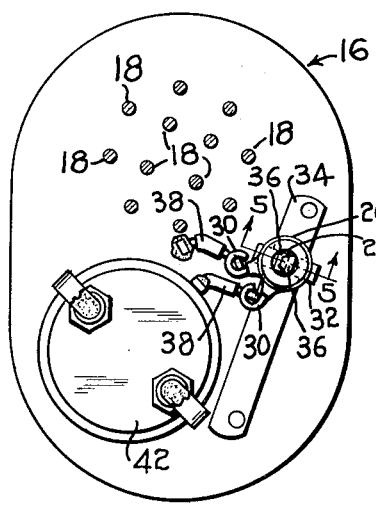
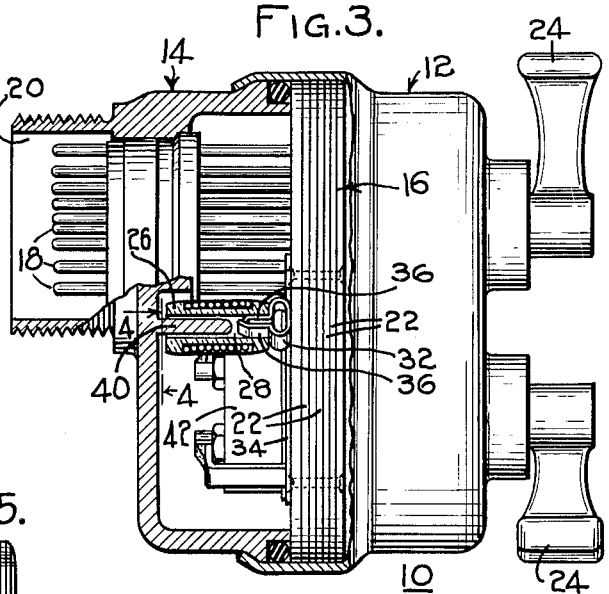
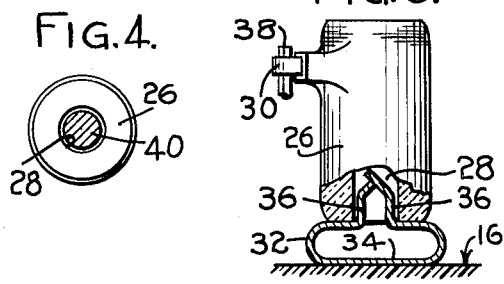
INVENTOR:
FRANK A. CLARY JR.,
BY Robert E Ross
ATTORNEY.

2,719,205
Patented Sept. 27, 1955

2,719,205

ELECTRICAL CONTROL DEVICE

Frank A. Clary, Jr., Bristol, Conn., assignor to United-Carr Fastener Corporation, Cambridge, Mass., a corporation of Massachusetts Application December 5, 1952, Serial No. 324,383

2 Claims. (Cl. 201—48)

This invention relates generally to electrical assemblies and has particular reference to a circuit continuing member such as an electrical switch or the like.

In certain types of electrical switches, where a plurality of circuits are to be controlled in various combinations, for example, in the master lighting switch in a military vehicle, such as a truck or tank, certain circuits may require that a resistor be included as an element of the circuit, and a thermal operated circuit breaker is also included to protect the switch against overloads. Since such assemblies are customarily enclosed in a water-tight housing, heat generated by the resistor may affect the operation of the circuit breaker unless the heat can be efficiently removed from the housing.

The object of the invention is to provide a housed electrical assembly having means for rapidly transferring heat generated by an internal resistor to the exterior of the housing.

A further object of the invention is to provide a housed electrical assembly in which the housing has an inwardly extending stud member entering a suitable aperture in an internal resistor to transfer heat generated by the resistor to the exterior of the housing.

Other objects of the invention will, in part, be obvious, and will, in part, appear hereinafter.

In the drawing:

Fig. 1 is a view of a disassembled electrical assembly embodying the features of the invention.

Fig. 2 is a view in section taken on line 2—2 of Fig. 1.

Fig. 3 is a view in elevation, partly in section, of the assembled electrical structure.

Fig. 4 is a view in section taken on line 4—4 of Fig. 3.

Fig. 5 is a view in section taken on line 5—5 of Fig. 2.

Referring to the drawing, there is illustrated an electrical assembly 10, which, in the illustrated embodiment, is a military vehicle switch, and comprises generally front and rear housing portions 12 and 14 respectively, and circuit continuing means assembled in the housing portions in the form of a wafer stack 16, with a plurality of connectors 18 protruding from the rear thereof through a suitable opening 20 in the rear housing portion 14.

The wafer stack 16 comprises a series of insulating wafers 22 having laterally extending connector bars disposed therein to vary the position of the circuits in passing therethrough so that contacts (not shown) on the forward end thereof will be in a suitable position for contact with switching contacts (not shown) assembled in the housing on the ends of external switch rotor arms 24.

The particular structure of the wafer stack 16 and the circuit changing mechanism inside the housing is fully described and claimed in a copending application of Vincent R. Herterick, Serial No. 266,550, filed January 15, 1952, and assigned to the same assignee as the present application. This portion of the structure does not form a part of the present application but is illustrated herein as an example of a particular type of electrical assembly embodying the features of the present invention.

In certain circuits passing through the switch 10, it is necessary that a predetermined amount of resistance be included in the circuit. For this reason, a resistor 26 is assembled in the housing, and the resistor is generally tubular with a central aperture 28 extending therethrough. Contacts 30 are provided at each end thereof for soldering to suitable connections to incorporate the resistor as an element of the desired circuit. The resistor 26 is mounted on the rear end of the wafer stack so as to extend therefrom toward the rear of the housing on a resilient mount 32, which comprises a base 34 attached to the rear of the wafer stack, with a pair of spaced arms 36 which are curled upwardly and inwardly in spaced relation to the base, and then extend outwardly therefrom to enter an end of the resistor aperture. The mount 32 merely positions the resistor laterally, the principal support for the resistor, until the final assembly, being connector wires 38 which connect the resistor to suitable contacts on the wafer stack.

The rear housing portion 14 is provided with an integral internal stud 40, which protrudes into the housing in a position opposite the resistor 26. (See Fig. 3.) The stud 40 is of a predetermined length so that when the front and rear portions of the housing are assembled, the stud enters the central aperture 28 of the resistor and extends a substantial distance therein. (See Fig. 3.) After assembly of the housing portions, the resistor is securely retained on the stud and the resilient mount, with the resiliency of the mount accommodating any slight variations in length of the resistor or variations in dimensions of other portions of the assembly.

To prevent damage to the switch by overloads or short circuits in the external circuit, a circuit breaker 42 is disposed in the housing and connected into the circuit to control the maximum amount of current that can flow through the switch. The circuit breaker 42 is ordinarily of the type which is thermally operated, that is, an excessive current passing therethrough generates sufficient heat inside the circuit breaker housing to break the circuit by means of a bimetal contact or similar device.

During operation of the switch, when current is flowing through the resistor, heat is generated therein. Since the heating is, in most cases, tightly sealed to keep out water and dirt, the heat generated by the resistor can be transferred out of the housing only by conduction through the housing walls. In many cases, this method of heat transfer is not sufficiently rapid to prevent a transfer of heat into the circuit breaker, which is undesirable in that it affects the operation of the circuit breaker by adding to the heat generated within the circuit breaker, causing it to break the circuit at a lower amperage than is desirable.

By the provision of the integral stud on the housing wall, extending into the central aperture of the resistor, a large portion of the heat generated by the resistor is transferred to the stud and hence to the housing wall, since the conductivity of the metal of the housing imparts excellent heat transfer characteristics between the stud and the housing wall. The operation of the circuit breaker is thereby not substantially affected by the presence of the resistor in the housing.

By the assembly of the resistor onto the wafer stack so that it extends toward the rear housing portion, and the provision of the stud protruding from the rear housing portion toward the front of the assembly, the assembly operation is facilitated since the stud and resistor are thereby disposed in the proper position when the two housing portions are forced together.

Although best results are obtained when the stud is integral with the wall, a separate assembled stud may be used in some cases, provided the stud is tightly joined to the wall to permit free transfer of heat from the stud to the wall.

It will also be understood that if a plurality of resistors are to be incorporated into the switch, a similar number of studs may be provided on the housing.

Since certain other obvious modifications may be made in the device illustrated without departing from the scope of the invention, it is intended that all matter contained herein be interpreted in an illustrative and not in a limiting sense.

I claim:

1. An electrical assembly, comprising a housing having a circuit completing means disposed therein and a resistor disposed in the housing as an element of a circuit, said resistor being of generally tubular form with an internal bore, said housing having an internal resistor support means which has portions extending into each end of the internal bore, one of said support means protruding from the housing wall, said other means having a laterally extending axially resilient seat portion disposed to bear against the adjacent end of the resistor and a laterally resilient portion projecting into the internal bore in resilient engagement therewith.

2. An electrical assembly, comprising a housing having opposing wall portions, circuit continuing means disposed in the housing and a resistor disposed therein as an element of a circuit, said resistor being of generally tubular form with an internal bore, said housing having an integral resistor support member protruding from one wall portion into the end of the internal bore of the resistor, and other support means at the other end of the resistor, said other support means having a laterally resilient portion projecting into the internal bore in resilient engagement therewith at said other end of the resistor and laterally extending resilient seat means bearing against said other end of the resistor.

References Cited in the file of this patent

FOREIGN PATENTS 437,112   Great Britain _____ Oct. 21, 1935